(12) United States Patent
Stanbro et al.

(10) Patent No.: US 8,138,288 B2
(45) Date of Patent: Mar. 20, 2012

(54) SYNTHESIS OF CATIONIC SILOXANE PREPOLYMERS

(75) Inventors: Jason K. Stanbro, Rochester, NY (US); Ivan M. Nunez, Penfield, NY (US); Jay F. Kunzler, Canandaigua, NY (US); Derek A. Schorzman, Cary, NC (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 13/039,912

(22) Filed: Mar. 3, 2011

(65) Prior Publication Data

US 2011/0146206 A1      Jun. 23, 2011

Related U.S. Application Data

(62) Division of application No. 12/018,910, filed on Jan. 24, 2008, now Pat. No. 7,951,897.

(60) Provisional application No. 60/886,675, filed on Jan. 26, 2007.

(51) Int. Cl.
    *C08F 30/08*      (2006.01)
    *C08F 290/00*     (2006.01)

(52) U.S. Cl. .......... 526/279; 53/425; 523/107; 528/120

(58) Field of Classification Search .................. 526/279; 53/425; 523/107; 528/120
    See application file for complete search history.

(56) References Cited

U.S. PATENT DOCUMENTS

| | | | |
|---|---|---|---|
| 3,808,179 A | 4/1974 | Gaylord | |
| 4,153,641 A | 5/1979 | Deichert et al. | |
| 4,260,725 A | 4/1981 | Keogh et al. | |
| 4,910,277 A | 3/1990 | Bambury et al. | |
| 5,070,215 A | 12/1991 | Bambury et al. | |
| 5,321,108 A | 6/1994 | Kunzler et al. | |
| 5,358,995 A | 10/1994 | Lai et al. | |
| 5,374,662 A | 12/1994 | Lai et al. | |
| 5,387,662 A | 2/1995 | Kunzler et al. | |
| 5,420,324 A | 5/1995 | Lai et al. | |
| 5,451,651 A | 9/1995 | Lai | |
| 5,496,871 A | 3/1996 | Lai et al. | |
| 5,539,016 A | 7/1996 | Kunzler et al. | |
| 5,594,085 A | 1/1997 | Lai | |
| 5,610,252 A | 3/1997 | Bambury et al. | |
| 5,639,908 A | 6/1997 | Lai | |
| 5,648,515 A | 7/1997 | Lai | |
| 6,630,132 B2 | 10/2003 | Fender et al. | |
| 7,468,397 B2 | 12/2008 | Schorzman | |
| 7,528,208 B2 | 5/2009 | Schorzman et al. | |
| 7,557,231 B2 | 7/2009 | Schorzman et al. | |
| 7,601,766 B2 | 10/2009 | Schorzman et al. | |
| 7,622,512 B2 | 11/2009 | Schorzman et al. | |
| 2007/0142584 A1 | 6/2007 | Schorzman et al. | .......... 526/264 |

OTHER PUBLICATIONS

U.S. Appl. No. 11/341,209, filed Jan. 27, 2006.
William J. Benjamin, et al., The Oxygen Permeability of Reference Materials, Optom Vis Sci 7 (12s): 95 (1997).
U.S. Appl. No. 11/341,209, filed Jan. 27, 2006, Schorzman et al.
U.S. Appl. No. 11/403,393, filed Apr. 13, 2006, Schorzman et al.
U.S. Appl. No. 11/480,111, filed Jun. 30, 2006, Schorzman et al.
U.S. Appl. No. 11/480,170, filed Jun. 30, 2006, Schorzman et al.
U.S. Appl. No. 11/611,508, filed Dec. 15, 2006, Schorzman et al.
U.S. Appl. No. 11/611,512, filed Dec. 15, 2006, Schorzman et al.
U.S. Appl. No. 11/619,211, filed Jan. 3, 2007, Schorzman et al.
U.S. Appl. No. 11/830,885, filed Jul. 31, 2007, Schorzman et al.
U.S. Appl. No. 11/837,049, filed Aug. 10, 2007, Kunzler et al.
U.S. Appl. No. 11/840,650, filed Aug. 17, 2007, Salamone et al.
U.S. Appl. No. 12/313,253, filed Nov. 18, 2008, Schorzman.
U.S. Appl. No. 12/459,778, filed Jul. 8, 2009, Kunzler et al.
U.S. Appl. No. 12/459,779, filed Jul. 8, 2009, Kunzler et al.
International Search Report and Written Opinion issued in counterpart International Patent Application No. PCT/US2008/051984.

*Primary Examiner* — Ling Choi
*Assistant Examiner* — Chun-Cheng Wang
(74) *Attorney, Agent, or Firm* — Glenn D. Smith

(57) ABSTRACT

This application is directed toward an improved method of synthesizing cationic siloxane prepolymers as well as a specific cationic siloxane prepolymer having improved compatibility with monofunctional siloxanyl methacrylate monomers and medical devices containing the cationic siloxane prepolymer.

14 Claims, No Drawings

SYNTHESIS OF CATIONIC SILOXANE PREPOLYMERS

CROSS REFERENCE TO RELATED APPLICATIONS

This application is a divisional of application Ser. No. 12/018,910 filed Jan. 24, 2008 which claims benefit of U.S. Provisional Appln. No. 60/886,675, which was filed Jan. 26, 2007.

FIELD

This application is directed toward improved methods of synthesizing cationic siloxane prepolymers as well as a specific cationic siloxane prepolymer having improved compatibility with monofunctional siloxanyl methacrylate monomers and medical devices containing the cationic siloxane prepolymer.

BACKGROUND OF THE INVENTION

US patent application publication number 2007/0142584 filed Jan. 27, 2006, the contents of which are incorporated by reference herein, discloses certain cationic siloxane prepolymers that are able to form water extractable medical devices as well as methods of making the monomers. An example of a monomer made according to the prior synthetic approach is provided in Formula (I) below:

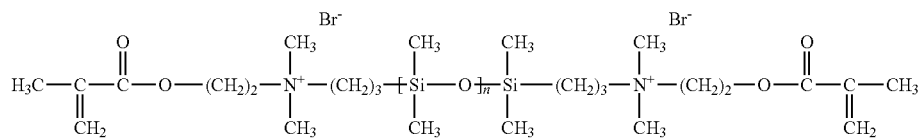

Formula (I)

wherein n is an integer from 1 to about 300.

The method taught in US patent application publication number 2007/0142584 used to synthesize a methacrylate capped cationic siloxane (bromide counter ion) is shown below:

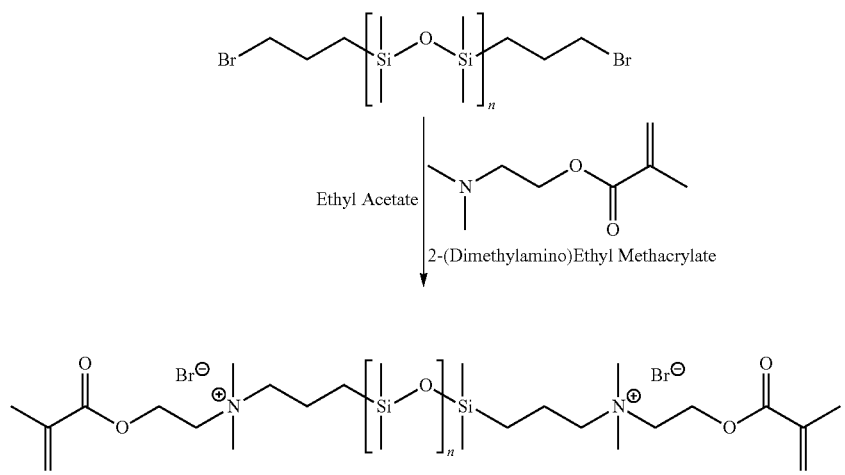

This reaction scheme requires the use of a large excess of the polymerization inhibitor 3,5-Di-tert-4butylhydroxytoluene (BHT) as well as a large excess of the reactant 2-(dimethylamino)ethyl methacrylate (DMAEMA). Another inhibitor which could be used is 4-methoxyphenol (MEHQ). Even though there is a large excess of DMAEMA, this reaction occurs at a very slow rate (100 hours at 60° C.) before product conversion nears 100%. In addition, the boiling point of DMAEMA is 182° C. Due to the cationic nature of the final product, the only way to remove the unreacted DMAEMA is with a combination of high vacuum and heat (stripping). Washing the material results in the emulsification and fractionation of the product. Also, since the product has methacrylate functionality, the stripping of the DMAEMA is problematic and often results in premature polymerization of the reaction product. This is especially the case as the reaction is scaled up. Therefore an improved method of synthesizing cationic siloxane prepolymers would be desirable In addition, although monomers such as those claimed in US patent application publication number 2007/0142584 provide medical devices that are entirely suitable in some circumstances, it was determined that medical devices prepared from a monomer mix containing a higher amount of monofunctional siloxane methacrylate would be highly desirable. We have discovered that an iodo salt of a cationic siloxane prepolymer having the structural formula (II) shown below:

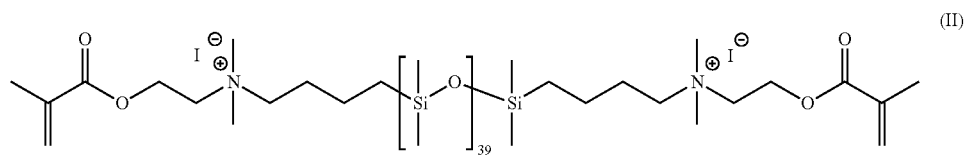

(II)

allows a greater amount of monofunctional siloxanyl methacrylate to be incorporated in the monomer mix than the bromo salt of a cationic siloxane prepolymer as shown in Formula (III)

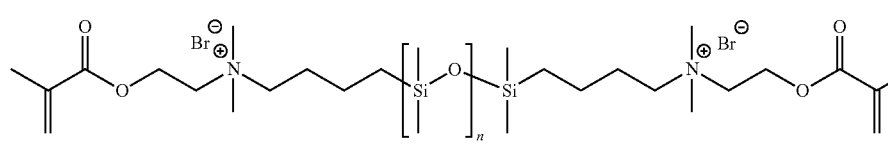

(III)

wherein n equals 39.

SUMMARY OF THE INVENTION

Provided herein are methods of making a cationic siloxane prepolymer wherein the reaction product is more easily isolated than cationic siloxane prepolymers prepared according to a previous method. The method comprises, in one embodiment, reacting bis-bromobutyl polydimethylsiloxane with 2-(methylamino)ethanol in polar solvent such as dioxane to provide a first reaction product. The first reaction product is then reacted with methacryloyl chloride or methacrylic anhydride in the presence of triethylamine in polar solvent such as chloroform to provide a second reaction product. The second reaction product is then reacted with iodomethane in tetrahydrofuran to provide the third reaction product as a cationic functionalized siloxane prepolymer.

Also provided is an improved cationic siloxane prepolymer that provides a lens material having improved properties as compared to other cationic siloxane polymers. The improved cationic siloxane prepolymer is a monomer having the following formula (IV):

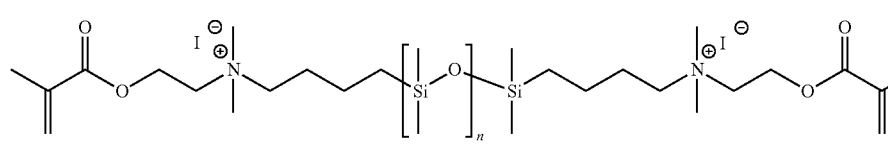

(IV)

wherein n is from 0 to 200.

BRIEF DESCRIPTION OF THE DRAWINGS

None

DETAILED DESCRIPTION

Provided herein is an improved method of making functionalized cationic siloxane prepolymers. In one embodiment, the method comprises reacting a bis-halide polysiloxane such as bis-bromobutyl polydimethylsiloxane with an alkyl functionalized hydroxy secondary amine such 2-(methylamino)ethanol to provide a first reaction product. Other alkyl functionalized hydroxy secondary amines would include 2-(ethylamino)ethanol, 2-(propylamino)ethanol, 2-(butylamino)ethanol.

The reaction is conducted in a polar solvent. Polar solvents are selected because they are able to dissolve the reactants and increase the reaction rate. Examples of polar solvents would include ethyl acetate, dioxane, THF, DMF, chloroform, etc.

The first reaction product is then reacted with a methacrylating agent to provide a second reaction product having vinyl polymerizable endgroups on the polysiloxane. Examples of methacrylating agents would include methacryloyl chloride, methacrylic anhydride, 2-isocyanatoethyl methacrylate, itaconic acid and itaconic anhydride.

Because HCl is produced during this stage of the reaction, which may result in deterioration of the polysiloxane, an acid scavenger such as triethylamine, triethanolamine, or 4-dimethylaminopyridine is used to reduce the amount of HCl formed during the synthesis. As utilized herein the expression "acid scavenger" refers to a material that reacts with any acid that is otherwise formed during the synthesis to prevent the degradation of the reaction product.

To quaternize the amine groups in the polysiloxane of the second reaction product an alkyl halide such as iodomethane is used as a quaternizing agent to provide the final third reaction product. The final product is isolated by removal of the solvent and any residual alkyl halide from the reaction mixture.

A schematic representation of the method is provided in the reaction schematic below:

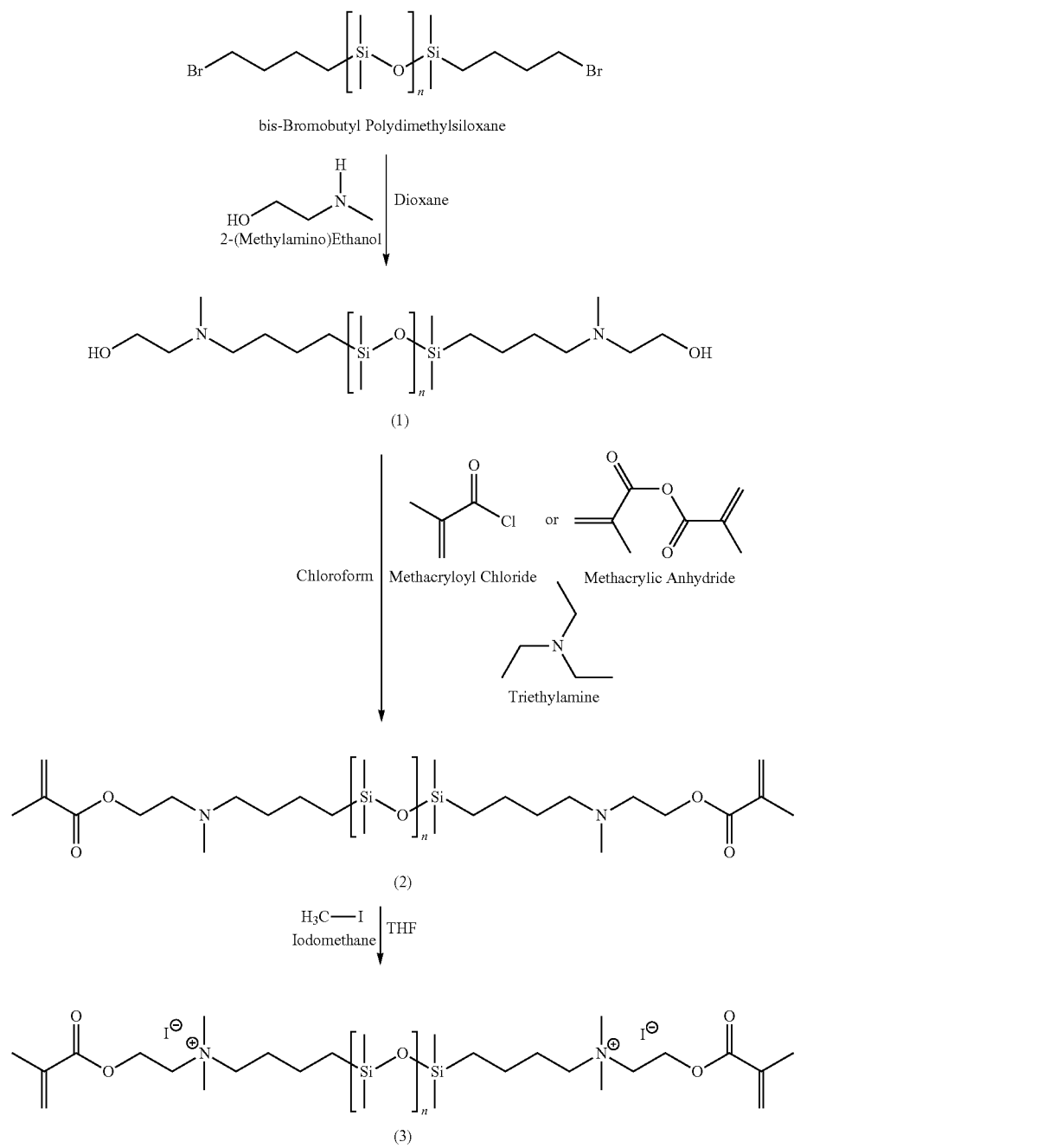

This new synthetic route divides the synthesis into three steps and differs dramatically from the previous procedure in that the quat functionality is formed at the last step of the reaction. This change in synthetic route allows for easy removal of unreacted starting materials and significantly reduces the occurrence of premature polymerization. Use of lower levels of polymerization inhibitor in the synthesis of the cationic siloxane prepolymer is also able to be achieved.

Following the given synthetic scheme, a known amount of bis-bromobutyl polydimethylsiloxane with known molecular weight was refluxed in dioxane with 2-(methylamino)ethanol for 72 hours at 75° C. to afford reaction product (1) after isolation. The structure of (1) was verified by NMR analysis. Product (1), with chloroform as a solvent, was then allowed to react with methacryloyl chloride in the presence of triethylamine at ambient temperature to afford reaction product (2) after isolation. The structure of product (2) was also verified by NMR analysis. The final step of the synthesis was the quaternization of (2) with iodomethane, using THF as a solvent, to afford reaction product (3) after 15 hours at 45° C. The structure of the final product, (3), was verified by NMR, SEC, and Mass Spectrometry analyses.

The method is particularly useful for synthesizing the following prepolymer which has desirable properties for forming a medical device.

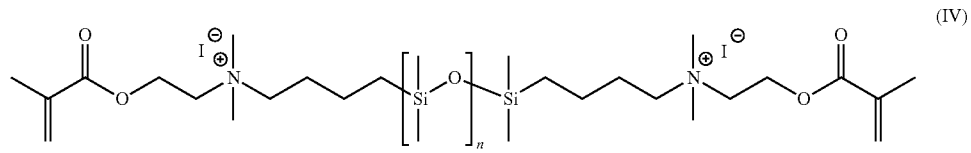

wherein n is from 0 to 200.

A preferred monomer is shown below wherein n equals 39.

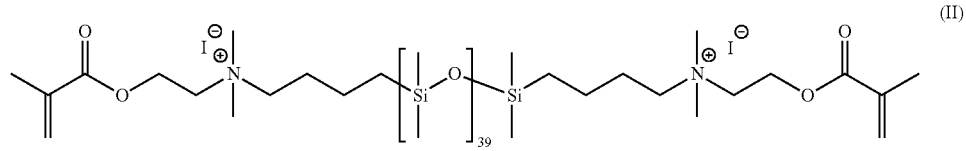

It was surprisingly discovered that use of the iodo salt of the cationic polysiloxane prepolymer, as compared to the bromo salt form, resulted in a monomer mix having improved compatibility with the other prepolymers. Improved compatibility was demonstrated by a visual comparison made between the two formulations. Greater than 3% of a monofunctional polysiloxane material caused cloudiness in the formulation made with the bromo salt of a cationic siloxane prepolymer, while up to 4.5% monofunctional polysiloxane material was added to a formulation made with the iodo salt of a cationic siloxane prepolymer without cloudiness resulting. This improved compatibility results in a monomer mix that allows increased concentrations of mono functional comonomers resulting in a polymerized product having improved physical properties.

In a further aspect, the invention includes articles formed of device forming monomer mixes comprising the prepolymers of formula (IV). According to preferred embodiments, the article is the polymerization product of a mixture comprising the aforementioned cationic siloxane prepolymer of formula (II) and at least a second monomer. Preferred articles are optically clear and useful as a contact lens.

Useful articles made with these materials may require hydrophobic, possibly silicon containing monomers. Preferred compositions have both hydrophilic and hydrophobic monomers. The invention is applicable to a wide variety of polymeric materials, either rigid or soft. Especially preferred polymeric materials are lenses including contact lenses, phakic and aphakic intraocular lenses and corneal implants although all polymeric materials including biomaterials are contemplated as being within the scope of this invention. Especially preferred are silicon containing hydrogels.

The present invention also provides medical devices such as heart valves and films, surgical devices, vessel substitutes, intrauterine devices, membranes, diaphragms, surgical implants, blood vessels, artificial ureters, artificial breast tissue and membranes intended to come into contact with body fluid outside of the body, e.g., membranes for kidney dialysis and heart/lung machines and the like, catheters, mouth guards, denture liners, ophthalmic devices, and especially contact lenses.

Silicon containing hydrogels are prepared by polymerizing a mixture containing at least one silicon-containing monomer and at least one hydrophilic monomer. The silicon-containing monomer may function as a crosslinking agent (a crosslinker being defined as a monomer having multiple polymerizable functionalities) or a separate crosslinker may be employed.

An early example of a silicon-containing contact lens material is disclosed in U.S. Pat. No. 4,153,641 (Deichert et al assigned to Bausch & Lomb Incorporated). Lenses are made from poly(organosiloxane) monomers which are α, ω terminally bonded through a divalent hydrocarbon group to a polymerized activated unsaturated group. Various hydrophobic silicon-containing prepolymers such as 1,3-bis(methacryloxyalkyl)-polysiloxanes were copolymerized with known hydrophilic monomers such as 2-hydroxyethyl methacrylate (HEMA).

U.S. Pat. No. 5,358,995 (Lai et al) describes a silicon containing hydrogel which is comprised of an acrylic ester-capped polysiloxane prepolymer, polymerized with a bulky polysiloxanylalkyl(meth)acrylate monomer, and at least one hydrophilic monomer. Lai et al is assigned to Bausch & Lomb Incorporated and the entire disclosure is incorporated herein by reference. The acrylic ester-capped polysiloxane prepolymer, commonly known as $M_2 D_x$ consists of two acrylic ester end groups and "x" number of repeating dimethylsiloxane units. The preferred bulky polysiloxanylalkyl(meth)acrylate monomers are TRIS-type (methacryloxypropyl tris(trimethylsiloxy)silane) with the hydrophilic monomers being either acrylic- or vinyl-containing.

Other examples of silicon-containing monomer mixtures which may be used with this invention include the following: vinyl carbonate and vinyl carbamate monomer mixtures as disclosed in U.S. Pat. Nos. 5,070,215 and 5,610,252 (Bambury et al); fluorosilicon monomer mixtures as disclosed in U.S. Pat. Nos. 5,321,108; 5,387,662 and 5,539,016 (Kunzler et al); fumarate monomer mixtures as disclosed in U.S. Pat. Nos. 5,374,662; 5,420,324 and 5,496,871 (Lai et al) and urethane monomer mixtures as disclosed in U.S. Pat. Nos. 5,451,651; 5,648,515; 5,639,908 and 5,594,085 (Lai et al), all of which are commonly assigned to assignee herein Bausch & Lomb Incorporated, and the entire disclosures of which are incorporated herein by reference.

Examples of non-silicon hydrophobic materials include alkyl acrylates and methacrylates.

The cationic siloxane prepolymer may be copolymerized with a wide variety of hydrophilic monomers to produce silicon hydrogel lenses. Suitable hydrophilic monomers include: unsaturated carboxylic acids, such as methacrylic and acrylic acids; acrylic substituted alcohols, such as 2-hydroxyethylmethacrylate and 2-hydroxyethylacrylate; vinyl lactams, such as N-vinyl pyrrolidone (NVP) and 1-vinylazonam-2-one; and acrylamides, such as methacrylamide and N,N-dimethylacrylamide (DMA).

Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art.

Hydrophobic cross-linkers would include methacrylates such as ethylene glycol dimethacrylate (EGDMA) and allyl methacrylate (AMA). In contrast to traditional silicon hydrogel monomer mixtures, the monomer mixtures containing the quaternized siloxane prepolymer of the invention herein are relatively water soluble. This feature provides advantages over traditional silicon hydrogel monomer mixtures in that there is less risk of incompatibility phase separation resulting in hazy lenses and the polymerized materials are extractable with water. However, when desired, traditional organic extraction methods may also be used. In addition, the extracted lenses demonstrate a good combination of oxygen permeability (Dk) and low modulus, properties known to be important to obtaining desirable contact lenses. Moreover, lenses prepared with the quaternized siloxane prepolymers of the invention herein are wettable even without surface treatment, provide dry mold release, do not require solvents in the monomer mix (although solvents such as glycerol may be used) the extracted polymerized material is not cytotoxic and the surface is lubricious to the touch. In cases where the polymerized monomer mix containing the quaternized siloxane prepolymers of the invention herein do not demonstrate a desirable tear strength, toughening agents such as TBE (4-t-butyl-2-hydroxycyclohexyl methacrylate) may be added to the monomer mix. Other strengthening agents are well known to those of ordinary skill in the art and may also be used when needed.

Although an advantage of the cationic siloxane prepolymers disclosed herein is that they are relatively water soluble and also soluble in their comonomers, an organic diluent may be included in the initial monomeric mixture. As used herein, the term "organic diluent" encompasses organic compounds which minimize incompatibility of the components in the initial monomeric mixture and are substantially nonreactive with the components in the initial mixture. Additionally, the organic diluent serves to minimize phase separation of polymerized products produced by polymerization of the monomeric mixture. Also, the organic diluent will generally be relatively non-inflammable.

Contemplated organic diluents include tent-butanol (TBA); diols, such as ethylene glycol and propylene glycol; and polyols, such as glycerol. Preferably, the organic diluent is sufficiently soluble in the extraction solvent to facilitate its removal from a cured article during the extraction step.

Other suitable organic diluents would be apparent to a person of ordinary skill in the art.

The organic diluent is included in an amount effective to provide the desired effect. Generally, the diluent is included at 5 to 60% by weight of the monomeric mixture, with 10 to 50% by weight being especially preferred.

According to the present process, the monomeric mixture, comprising at least one hydrophilic monomer, at least one cationic siloxane prepolymer and optionally the organic diluent, is shaped and cured by conventional methods such as static casting or spincasting.

Lens formation can be by free radical polymerization such as azobisisobutyronitrile (AIBN) and peroxide catalysts using initiators and under conditions such as those set forth in U.S. Pat. No. 3,808,179, incorporated herein by reference. Photo initiation of polymerization of the monomer mixture as is well known in the art may also be used in the process of forming an article as disclosed herein. Colorants and the like may be added prior to monomer polymerization.

Subsequently, a sufficient amount of unreacted monomer and, when present, organic diluent is removed from the cured article to improve the biocompatibility of the article. Release of non-polymerized monomers into the eye upon installation of a lens can cause irritation and other problems. Unlike other monomer mixtures that must be extracted with flammable solvents such as isopropyl alcohol, because of the properties of the novel quaternized siloxane prepolymers disclosed herein, non-flammable solvents including water may be used for the extraction process.

Once the biomaterials formed from the polymerized monomer mix containing the cationic siloxane prepolymers monomers disclosed herein are formed they are then extracted to prepare them for packaging and eventual use. Extraction is accomplished by exposing the polymerized materials to various solvents such as water, tert-butanol, etc. for varying periods of time. For example, one extraction process is to immerse the polymerized materials in water for about three minutes, remove the water and then immerse the polymerized materials in another aliquot of water for about three minutes, remove that aliquot of water and then autoclave the polymerized material in water or buffer solution.

Following extraction of unreacted monomers and any organic diluent, the shaped article, for example an RGP lens, is optionally machined by various processes known in the art. The machining step includes lathe cutting a lens surface, lathe cutting a lens edge, buffing a lens edge or polishing a lens edge or surface. The present process is particularly advantageous for processes wherein a lens surface is lathe cut, since machining of a lens surface is especially difficult when the surface is tacky or rubbery.

Generally, such machining processes are performed before the article is released from a mold part. After the machining operation, the lens can be released from the mold part and hydrated. Alternately, the article can be machined after removal from the mold part and then hydrated.

EXAMPLES

All solvents and reagents were obtained from Sigma-Aldrich, Milwaukee, Wis., and used as received with the exception of aminopropyl terminated poly(dimethylsiloxane), 900-1000 and 3000 g/mol, obtained from Gelest, Inc., Morrisville, Pa., and methacryloxypropyltris(trimethylsiloxy)silane, obtained from Silar Laboratories, Scotia, N.Y., which were both used without further purification. The monomers 2-(hydroxyethyl)methacrylate and 1-vinyl-2-pyrrolidone were purified using standard techniques.

Analytical Measurements

NMR: $^1$H-Nuclear Magnetic Resonance (NMR) characterization is carried out using a 400 MHz Varian spectrometer using standard techniques in the art. Samples are dissolved in chloroform-d (99.8 atom % D), unless otherwise noted. Chemical shifts are determined by assigning the residual chloroform peak at 7.25 ppm. Peak areas and proton ratios are determined by integration of baseline separated peaks. Splitting patterns (s=singlet, d=doublet, t=triplet, q=quartet, m=multiplet, br=broad) and coupling constants (J/Hz) are reported when present and clearly distinguishable.

SEC: Size Exclusion Chromatography (SEC) analyses are carried out by injection of 100 μL of sample dissolved in tetrahydrofuran (THF) (5-20 mg/mL) onto a Polymer Labs PL Gel Mixed Bed E (×2) column at 35° C. using a Waters 515 HPLC pump and HPLC grade THF mobile phase flow rate of 1.0 mL/min, and detected by a Waters 410 Differential Refractometer at 35° C. Values of $M_n$, $M_w$, and polydispersity (PD) is determined by comparison to Polymer Lab Polystyrene narrow standards.

ESI-TOF MS: The electrospray (ESI) time of flight (TOF) MS analysis was performed on an Applied Biosystems Mariner instrument. The instrument operated in positive ion mode. The instrument is mass calibrated with a standard solution containing lysine, angiotensinogen, bradykinin (fragment 1-5) and des-Pro bradykinin. This mixture provides a seven-point calibration from 147 to 921 m/z. The applied voltage parameters are optimized from signal obtained from the same standard solution.

Stock solutions of the polymer samples are prepared as 1 mg/mL in tetrahydrofuran (THF). From these stock solutions, samples are prepared for ESI-TOF MS analysis as 30 μM solutions in isopropanol (IPA) with the addition of 2% by volume saturated NaCl in WA. Samples are directly infused into the ESI-TOF MS instrument at a rate of 35 μL/min.

Mechanical properties and Oxygen Permeability: Modulus and elongation tests are conducted according to ASTM D-1708a, employing an Instron (Model 4502) instrument where the hydrogel film sample is immersed in borate buffered saline; an appropriate size of the film sample is gauge length 22 mm and width 4.75 mm, where the sample further has ends forming a dog bone shape to accommodate gripping of the sample with clamps of the Instron instrument, and a thickness of 200+50 microns.

Oxygen permeability (also referred to as Dk) is determined by the following procedure. Other methods and/or instruments may be used as long as the oxygen permeability values obtained therefrom are equivalent to the described method. The oxygen permeability of silicone hydrogels is measured by the polarographic method (ANSI Z80.20-1998) using an O2 Permeometer Model 201T instrument (Createch, Albany, Calif. USA) having a probe containing a central, circular gold cathode at its end and a silver anode insulated from the cathode. Measurements are taken only on pre-inspected pinhole-free, flat silicone hydrogel film samples of three different center thicknesses ranging from 150 to 600 microns. Center thickness measurements of the film samples may be measured using a Rehder ET-1 electronic thickness gauge. Generally, the film samples have the shape of a circular disk. Measurements are taken with the film sample and probe immersed in a bath containing circulating phosphate buffered saline (PBS) equilibrated at 35° C.+/−0.2°. Prior to immersing the probe and film sample in the PBS bath, the film sample is placed and centered on the cathode premoistened with the equilibrated PBS, ensuring no air bubbles or excess PBS exists between the cathode and the film sample, and the film sample is then secured to the probe with a mounting cap, with the cathode portion of the probe contacting only the film sample. For silicone hydrogel films, it is frequently useful to employ a Teflon polymer membrane, e.g., having a circular disk shape, between the probe cathode and the film sample. In such cases, the Teflon membrane is first placed on the premoistened cathode, and then the film sample is placed on the Teflon membrane, ensuring no air bubbles or excess PBS exists beneath the Teflon membrane or film sample. Once measurements are collected, only data with correlation coefficient value (R2) of 0.97 or higher should be entered into the calculation of Dk value. At least two Dk measurements per thickness, and meeting R2 value, are obtained. Using known regression analyses, oxygen permeability (Dk) is calculated from the film samples having at least three different thicknesses. Any film samples hydrated with solutions other than PBS are first soaked in purified water and allowed to equilibrate for at least 24 hours, and then soaked in PHB and allowed to equilibrate for at least 12 hours. The instruments are regularly cleaned and regularly calibrated using RGP standards. Upper and lower limits are established by calculating a +/−8.8% of the Repository values established by William J. Benjamin, et al., The Oxygen Permeability of Reference Materials, Optom Vis Sci 7 (12s): 95 (1997), the disclosure of which is incorporated herein in its entirety:

| Material Name | Repository Values | Lower Limit | Upper Limit |
|---|---|---|---|
| Fluoroperm 30 | 26.2 | 24 | 29 |
| Menicon EX | 62.4 | 56 | 66 |
| Quantum II | 92.9 | 85 | 101 |

Abbreviations
MI-MCR-C12

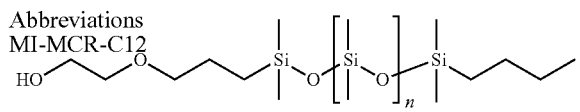

n is about 11

NVP 1-Vinyl-2-pyrrolidone
TRIS Methacryloxypropyltris(trimethylsiloxy)silane
HEMA 2-Hydroxyethyl methacrylate
v-64 2,2'-Azobis(2-methylpropionitrile)
PG 1,3-Propanediol
EGDMA Ethylene glycol dimethacrylate
SA 2-[3-(2H-Benzotriazol-2-yl)-4-hydroxyphenyl]ethyl methacrylate
IMVT 1,4-bis[4-(2-methacryloxyethyl)phenylamino]anthraquinone Liquid monomer solutions containing cationic end-capped poly(dimethylsiloxane) prepolymers from examples below, along with other additives common to ophthalmic materials (diluent, initiator, etc.) are clamped between silanized glass plates at various thicknesses and polymerized using thermal decomposition of the free-radical generating additive by heating 2 h at 100° C. under a nitrogen atmosphere. Each of the formulations affords a transparent, tack-free, insoluble film.

Films are removed from glass plates and hydrated/extracted in deionized H$_2$O for a minimum of 4 hours, transferred to fresh deionized H$_2$O and autoclaved 30 min at 121° C. The cooled films are then analyzed for selected properties of interest in ophthalmic materials. Mechanical tests are conducted in borate buffered saline according to ASTM D-1708a, discussed above. The oxygen permeabilities, reported in Dk (or barrer) units, are measured in phosphate buffered saline at 35° C., using acceptable films with three different thicknesses, as discussed above.

Unless otherwise specifically stated or made clear by its usage, all numbers used in the examples should be considered to be modified by the term "about" and to be weight percent.

Example 1

Synthesis of
1,3-bis(4-bromobutyl)tetramethyldisiloxane
RD-1862 "Iodo M2D39 Plus"

This example details the synthetic procedure for the production of the intermediate, 1,3-bis(4-bromobutyl)tetramethyldisiloxane.

I. Preparation of
1,3-bis(4-bromobutyl)tetramethyldisiloxane

Reaction Scheme

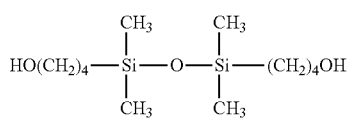

48% HBr, Toluene | Aliquot 336

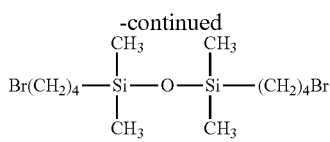

Materials
- 1,3-bis(4-hydroxybutyl)tetramethyldisiloxane, vacuum stripped at 60° C. and 0.6 mbar for 2 hours
- Aliquot® 336 (reg. trademark of Henkel Corporation), as received
- Toluene (99.5%), as received
- Hydrobromic acid (48%) aqueous HBr, as received
- Saturated NaCl
- 0.5 M Sodium Bicarbonate solution
- Magnesium Sulfate (anhydrous), as received
- Silica gel 60 (E. Merck 7734-4), as received
- Heptane (99%), as received
- Methylene chloride (99.5%), as received Equipment
- 5 L 3-neck round bottom Morton flask
- Teflon bladed mechanical stirrer
- Condenser
- Thermometer
- 6 L separatory funnel
- Vacuum filtration apparatus
- House (low) vacuum setup
- Vacuum pump, roughing
- Chromatography column (3.5 in.×30. in.)
- Rotary evaporator Tolerances
- Temperatures: ±2° C.
- Times: ±1 hour
- Volumes: ±10 mL
- Weights: ±0.2 g Preparation
1. A 5 L 3-neck round bottom Morton flask is equipped with a Teflon bladed mechanical stirring system and a condenser.
2. 1,3-bis(4-hydroxybutyl)tetramethyldisiloxane (837.2 g, 3.0 mol) is added to the flask along with 48.6 g (0.12 mol) Aliquat® 336 in toluene (1000 mL) and 2.0 L of 48% HBr (aq).
3. The reaction mixture is heated to 100° C. for 16 hours with vigorous stirring.
4. After cooling, the organic layer is separated in a 6 L separatory funnel.
5. Wash with 1×2 L saturated NaCl, 0.5 M Sodium Bicarbonate solution (3×500 mL).
6. Dry over magnesium sulfate and filter product by vacuum.
7. Heat product to 60° C. and remove solvents with roughing pump (1.3 mbar). Crude yield is expected to be about 1250 g.
8. A silica gel column (2 kg silica gel, column 3.5 inches in diameter and 30 inches long) is prepared by slurry packing with heptane.
9. The yellow silicone liquid is placed on the silica gel chromatography column with heptane (200 g).
10. Elute with 1.5 L 100% heptane, 1 L 100% heptane, 1 L 80% heptane 20% methylene chloride, then 1 L 60% heptane 40% methylene chloride until done.
11. Start collecting after the first 1 L collected as Fraction "0". The organic fractions 1 (65.6 g), 2, 3 (343 g), 4, 5, 6 (33 g), 7 (31 g), 8 (19.4 g), were recombined and solvents removed by flash vaporization by a Rotary evaporator at reduced pressure to afford 1093.4 g of 1,3-bis(4-bromobutyl)tetramethyldisiloxane as a colorless liquid.

Example 2

Synthesis of Poly(dimethylsiloxane) Terminated with Cationic Polymerizable Functionality (RD-1862 "Iodo M2D39 Plus")

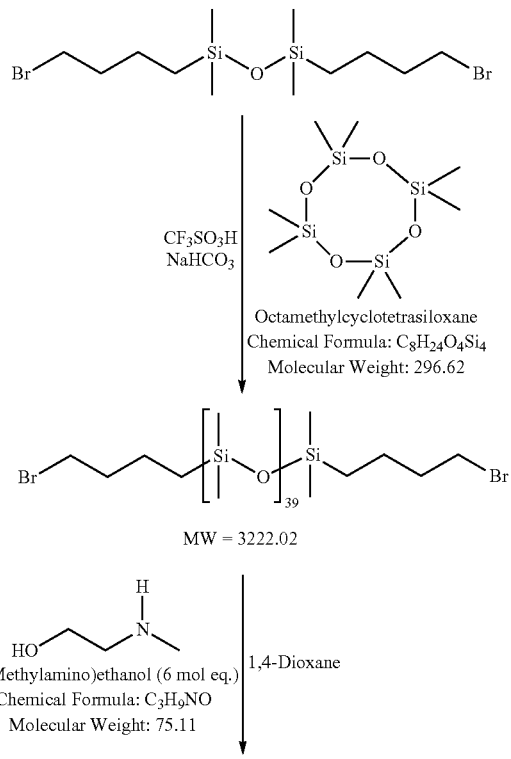

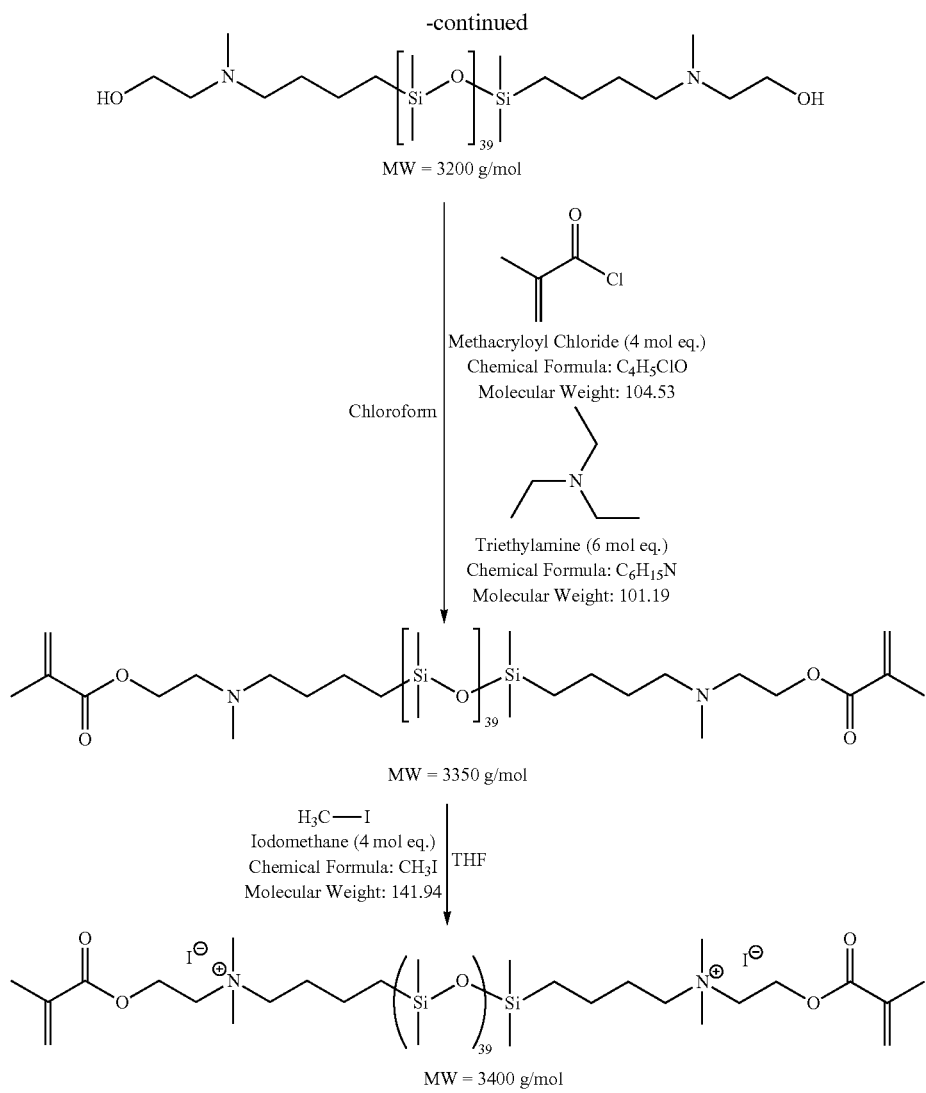

This example details the synthetic procedure for the production of the final product, cationic methacrylate terminated poly(dimethylsiloxane), "Iodo M2D39 Plus".

Materials
  Drierite (8 mesh), as received
  1,3-bis(4-bromobutyl)tetramethyldisiloxane (96.5%), as received
  Octamethylcyclotetrasiloxane ($D_4$) (98%), as received
  Trifluoromethanesulfonic acid (98%), as received
  Sodium bicarbonate (99.7%), as received
  Celite 503, as received
  Acetone (99%), as received
  Dry ice, as received
  1,4-Dioxane (anhydrous, 99.8%), as received
  2-(Methylamino)ethanol (98%), as received
  Chloroform (anhydrous, 99%), as received
  Brine solution
  Deionized water
  Magnesium sulfate (anhydrous), as received
  Triethylamine (99.5%), as received
  2,6-Di-tert-butyl-methylphenol (BHT) (99%), as received
  Methacryloyl chloride (≧97%), as received
  Sodium carbonate (99%), as received
  Amberlyst A26 hydroxide form resin, as received
  Tetrahydrofuran (anhydrous, 99.9%), as received
  Iodomethane (99%), as received Equipment
  Flasks: 1000 mL round bottom (×3), 3-neck 1000 mL round bottom, 500 mL pressure flask (round bottom)
  Teflon bladed mechanical stirrer
  Drying tube
  Pressure filter (stainless steel)
  Nitrogen gas
  PTFE filter (5 μm)
  Magnetic stir plate
  Magnetic stir bar
  Thermometers
  Vacuum pump, roughing
  Vacuum traps
  1 L Heating mantle
  Temperature controller with thermocouple
  Condenser (water-cooled)
  Rubber septa
  Rotary evaporator
  Separatory funnel (1000 mL)
  Vacuum filtration apparatus Glass microfiber filter paper (retains samples down to 0.7 μm)
House (low) vacuum setup
Heat gun
Addition funnel (100 mL)
Oil bath
Aluminum foil
Refrigerator/freezer
Dry box (<5% relative humidity)
House air (dry, oil free)
Funnels
Spatulas Tolerances
Temperatures: ±2° C.
Times: ±1 hour, unless noted otherwise
Volumes: ±1 mL
Weights: ±1 g Preparation
Step 1: Ring-Opening Polymerization
1. In a 1000 mL round bottom flask equipped with an overhead mechanical stirrer and drying tube (with Drierite), 1,3-bis(4-bromobutyl)tetramethyldisiloxane (61.3 g) and octamethylcyclotetrasiloxane (438.7 g) are added.
2. Trifluoromethanesulfonic acid (1.25 g, 0.25 w/w %) is added and stirred 24 hours at room temperature.
3. To the reaction is added sodium bicarbonate (7 g) and the mixture is allowed to stir at a moderate rate for an additional 24 hours at room temperature.
4. The mixture is then filtered with slight positive nitrogen pressure through a pressure filter system equipped with 5 μm PTFE filter and a Celite pad into a 1000 mL round bottom flask.
5. The mixture is stirred magnetically and stripped for at least 4 hours at 80° C. and <1.3 mbar using a vacuum pump and acetone/dry ice trap, or until collection of residual octamethylcyclotetrasiloxane is essentially complete (no further collection of liquid) to afford the product as a transparent, colorless, viscous liquid (426 g, 85% yield).

Product: 1,3-bis(4-bromobutyl)poly(dimethylsiloxane) as a transparent colorless liquid
$M_n$=1500-3000, and PD=1.5-2.5 by gel permeation chromatography (GPC)

Step 2: Reaction with 2-(methylamino)ethanol
1. The colorless liquid product from step 1.5 above (200 g) was then dissolved in 1,4-dioxane (500 mL, 2.5 mL/g dioxane to silicone) in a 3-neck 1000 mL round bottom flask. The flask was equipped a mechanical stirring system, a 1 L heating mantle, a water-cooled condenser, and a thermocouple to monitor the reaction temperature.
2. 2-(methylamino)ethanol (30 mL, 6 mol eq.) was added to the reaction vessel.
3. The flask was sealed with rubber septum and placed under a nitrogen purge.
4. The reaction was then heated for 72 hours at 100° C. and stirred vigorously.
5. The contents of 3-neck 1000 mL flask were transferred to 1-neck 1000 mL round bottom flask and dioxane was removed via a rotary evaporator.
6. Silicone product was redissolved in chloroform and transferred to 1000 mL separatory funnel.
7. Product washed with 500 mL brine solution (×2), 500 mL 5% sodium bicarbonate solution (3×), followed by another wash with 500 mL brine solution.
8. Silicone product collected from Step 2.7 and dried with magnesium sulfate (enough to absorb all the water in the product).
9. Product vacuum filtered and solvent removed with a rotary evaporator/vacuum pump to afford intermediate product.
10. Product confirmed with NMR spectroscopy.

Step 3: Methacrylation with Methacryloyl Chloride
1. Silicone product from Step 2.9 was redissolved in anhydrous chloroform (3.0 mL/g silicone) and transferred to 1000 mL round bottom flask (dried with heat gun) with magnetic stir bar.
2. Triethylamine (6 mol eq.) was added to the reaction, along with 250 ppm BHT inhibitor.
3. An addition funnel (dried with heat gun) was added to the flask and methacryloyl chloride (4 mol eq.) was added to the funnel along with chloroform to dilute the acid chloride (approx. twice the volume of the acid chloride). The system was then capped with rubber septum and purged with $N_2$.
4. The reaction was stirred and the acid chloride was added dropwise. The reaction was allowed to stir 15 hours at ambient temperature.
5. Reaction transferred to 1000 mL separatory funnel and washed with 500 mL brine solution (×2), 500 mL 5% sodium carbonate solution (×2), and again with 500 mL brine solution.
6. An excess of Amberlyst A26 resin was rinsed with chloroform and then stirred into the product from Step 3.5 for one hour. Magnesium sulfate added to dry system.
7. Solids vacuum filtrated out of product and product concentrated via rotary evaporator.
8. Product confirmed via NMR spectroscopy.

Step #4: Quaternization
1. Product from Step 3.7 dissolved in THF (2.0 mL/g silicone) and transferred to 500 mL round bottom pressure flask with stir bar.
2. Iodomethane (8 mol eq.) added to reaction.
3. Reaction vessel sealed and allowed to stir in a 45° C. oil bath for 15 hours protected from light (wrapped in Al foil).
4. System placed on a rotary evaporator to remove all solvent and excess iodomethane to afford a yellow, waxy solid product.
5. Product sealed and allowed to harden at approx. −20° C.
6. Product chopped with spatula and residual iodomethane/solvent removed with vacuum pump (product kept at ambient temperature).
7. Product moved to dry box with dry air environment for transferring, sampling, etc. and stored at −20° C. with a drying agent to prevent moisture contamination.
8. Product confirmed by NMR spectroscopy, Mass Spectrometry, Gel Permeation Chromatography, and Gas Chromatography.

Cationic methacrylate terminated poly(dimethylsiloxane) (RD-1862, "Iodo M2D39 Plus") as a slightly yellow, waxy-solid product.

Example 3

Synthesis of RD-1862 "Iodo $M_2D_{29}$ Plus"

Purpose
This document details the synthetic procedure for the production of the intermediate, 1,3-bis(4-bromobutyl)tetramethyldisiloxane and the final product, cationic methacrylate terminated poly(dimethylsiloxane), "Iodo $M_2D_{39}$ Plus".

I. Preparation of 1,3-bis(4-bromobutyl)tetramethyldisiloxane

Reaction Scheme

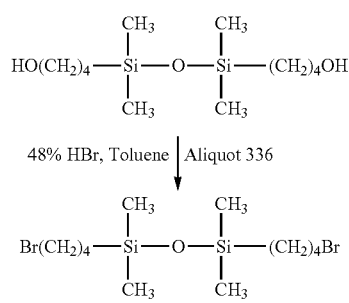

Materials
  1,3-bis(4-hydroxybutyl)tetramethyldisiloxane, vacuum stripped at 60° C. and 0.6 mbar for 2 hours
  Aliquot® 336 (reg. trademark of Henkel Corporation), as received from Aldrich
  Toluene (99.5%), as received from Aldrich
  Hydrobromic acid (48%) aqueous HBr), as received from Aldrich
  Saturated sodium chloride solution
  0.5 M Sodium bicarbonate solution
  Magnesium sulfate (anhydrous), as received from Fisher Scientific
  Silica gel 60 (E. Merck 7734-4), as received
  Heptane (99%), as received from Aldrich
  Methylene chloride (99.5%), as received from Aldrich Equipment
  5 L 3-neck round bottom Morton flask
  Teflon bladed mechanical stirrer
  Teflon stirrer bearing
  Teflon sleeves
  Condenser
  Thermometer or thermocouple
  6 L separatory funnel
  Vacuum filtration apparatus
  House (low) vacuum setup
  Vacuum pump, roughing
  Chromatography column (3.5 in.×30. in.)
  Rotary evaporator Tolerances
  Temperatures: ±2° C.
  Times: ±1 hour
  Volumes: ±10 mL
  Weights: ±0.2 g Preparation 1. A 5 L 3-neck round bottom Morton flask is equipped with a Teflon bladed mechanical stirring system and a condenser.
2. 1,3-bis(4-hydroxybutyl)tetramethyldisiloxane (837.2 g, 3.0 mol) is added to the flask along with 48.6 g (0.12 mol) Aliquat® 336 in toluene (1000 mL) and 2.0 L of 48% HBr (aq).
3. The reaction mixture is heated to 100° C. for 16 hours with vigorous stirring.
4. After cooling, the organic layer is separated in a 6 L separatory funnel.
5. Wash with 1×2 L saturated NaCl, 0.5 M Sodium Bicarbonate solution (3×500 mL).
6. Dry over magnesium sulfate and filter product by vacuum.
7. Heat product to 60° C. and remove solvents with roughing pump (1.3 mbar). Crude yield is expected to be about 1250 g.
8. A silica gel column (2 kg silica gel, column 3.5 inches in diameter and 30 inches long) is prepared by slurry packing with heptane.
9. The yellow silicone liquid is placed on the silica gel chromatography column with heptane (200 g).
10. Elute with 1.5 L 100% heptane, 1 L 100% heptane, 1 L 80% heptane 20% methylene chloride, then 1 L 60% heptane 40% methylene chloride until done.
11. Start collecting after the first 1 L collected as Fraction "0". The organic fractions 1 (65.6 g), 2, 3 (343 g), 4, 5, 6 (33 g), 7 (31 g), 8 (19.4 g), were recombined and solvents removed by flash vaporization by a Rotary evaporator at reduced pressure to afford 1093.4 g of 1,3-bis(4-bromobutyl)tetramethyldisiloxane as a colorless liquid.

II. Synthesis of Poly(dimethylsiloxane) Terminated with Cationic Polymerizable Functionality Overview:

RD1862 (IODO M$_2$D$_{39}$Plus) Synthetic Scheme

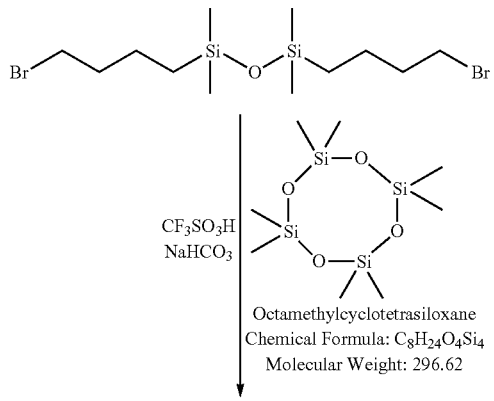

Octamethylcyclotetrasiloxane
Chemical Formula: C$_8$H$_{24}$O$_4$Si$_4$
Molecular Weight: 296.62

-continued

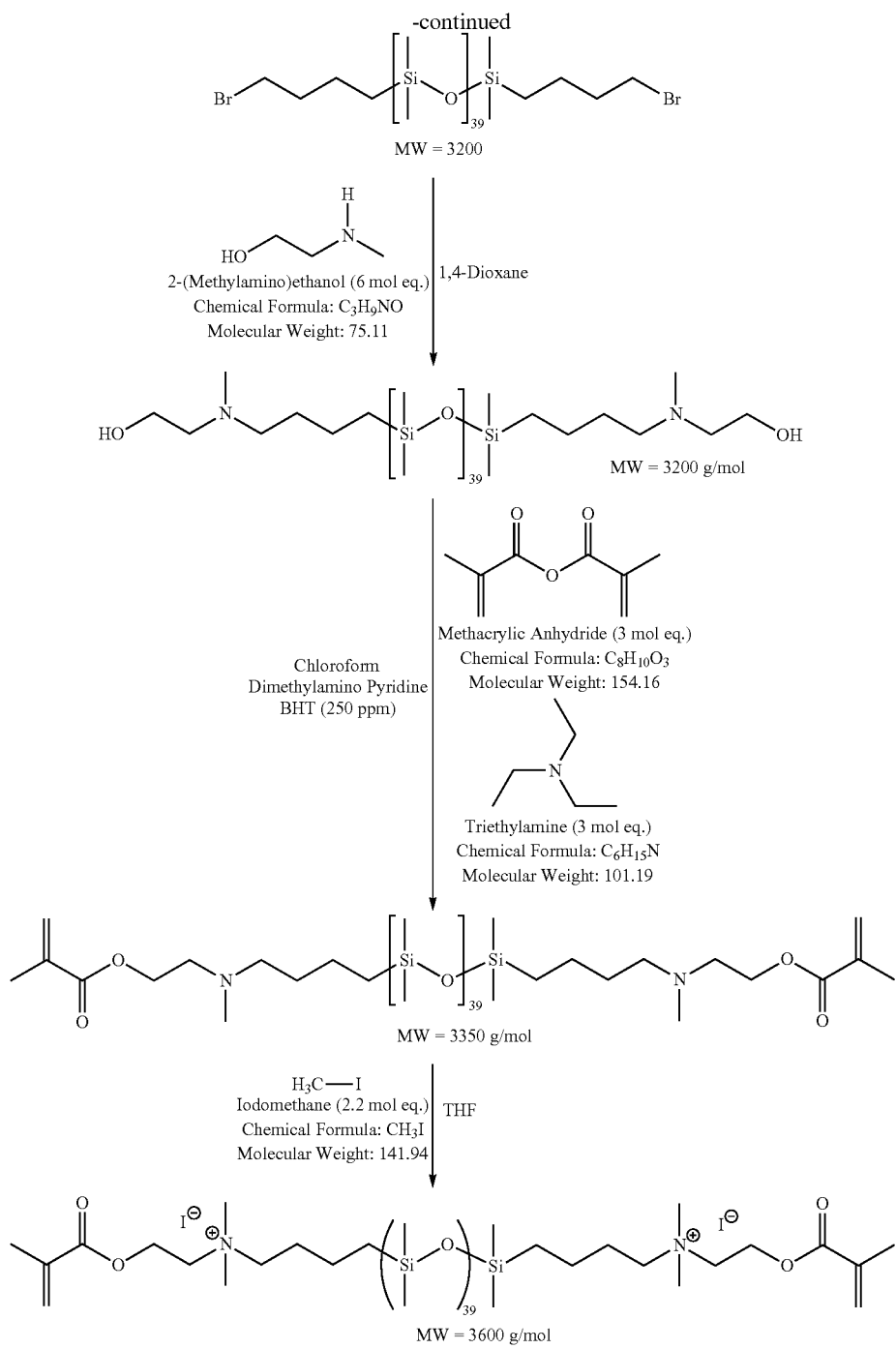

Materials
  Drierite (8 mesh), as received from Fisher Scientific
  1,3-bis(4-bromobutyl)tetramethyldisiloxane (96.5%), made according to above procedure
  Octamethylcyclotetrasiloxane (D$_4$) (98%), as received
  Trifluoromethanesulfonic acid (98%), as received from Aldrich
  Sodium bicarbonate (99.7%), as received Fisher Scientific
  Celite 503, as received from Fisher Scientific
  Acetone (99%), as received from Aldrich
  Dry ice
  1,4-Dioxane (anhydrous, 99.8%), as received from Aldrich
  2-(Methylamino)ethanol (98%), as received from Aldrich
  Chloroform (anhydrous, 99%), as received from Aldrich
  Saturated sodium chloride solution (Brine)
  Deionized water
  Magnesium sulfate (anhydrous), as received from Fisher Scientific
  Triethylamine (99.5%), as received from Aldrich
  2,6-Di-tert-butyl-methylphenol (BHT) (99%), as received from Aldrich
  Methacrylic anhydride (≧94%), as received from Aldrich
  Dimethylamino pyridine (97%), as received from Aldrich Sodium carbonate (99%), as received from Fisher Scientific Amberlyst A26 hydroxide form resin, as received from Aldrich Tetrahydrofuran (anhydrous, 99.9%), as received from Aldrich Iodomethane (99%), as received from Aldrich Equipment Flasks: 1000 mL round bottom (1-neck), 1000 mL round bottom (2-neck), 2000 mL round bottom (1-neck), 2000 mL round bottom (3-neck).

Teflon bladed mechanical stirrer

Teflon stir bearing

Teflon sleeves

Teflon stoppers

Drying tube

Pressure filter (stainless steel)

Nitrogen gas

PTFE filter (5 μm)

Magnetic stir plate

Magnetic stir bars

Thermometers

Vacuum pump, roughing

Vacuum traps

2 L Heating mantle

Temperature controller with thermocouple

Condenser (water-cooled)

Rubber septa

Rotary evaporator

Separatory funnel (4000 mL)

Vacuum filtration apparatus

Glass microfiber filter paper (retains samples down to 0.7 μm)

House (low) vacuum setup

Heat gun

Addition funnel (250 mL)

Water bath

Refrigerator/freezer

Dry box ($\leq$5% relative humidity)

House air (dry, oil free)

Funnels

Spatulas

Tolerances

Temperatures: ±2° C.

Times: ±1 hour, unless noted otherwise

Volumes: ±1 mL

Weights: ±1 g

Preparation

Step 1: Ring-Opening Polymerization

1. In a 2-neck 1000 mL round bottom flask equipped with an overhead mechanical stirrer and drying tube (with Drierite), 1,3-bis(4-bromobutyl)tetramethyldisiloxane (61.3 g) and octamethylcyclotetrasiloxane (438.7 g) are added.
2. Trifluoromethanesulfonic acid (1.25 g, 0.25 w/w %) is added and stirred 24 hours at room temperature.
3. To the reaction is added sodium bicarbonate (7 g) and the mixture is allowed to stir at a moderate rate for an additional 24 hours at room temperature.
4. The mixture is then filtered with slight positive nitrogen pressure through a pressure filter system equipped with 5 μm PTFE filter and a celite pad into a 1000 mL round bottom flask.
5. The mixture is stirred with a magnetic stir bar and stripped for at least 4 hours at 80° C. and <1.3 mbar using a vacuum pump and acetone/dry ice trap, or until collection of residual octamethylcyclotetrasiloxane is essentially complete (no further collection of liquid) to afford the product as a transparent, colorless, viscous liquid (426 g, 85% yield).

Step 2: Reaction with 2-(methylamino)ethanol

1. The colorless liquid product from step 1.5 above (504 g) was then dissolved in 1,4-dioxane (504 mL, 1 mL dioxane per gram silicone) in a 3-neck 2000 mL round bottom flask. The flask was equipped a mechanical stirring system, a 1 L heating mantle, a water-cooled condenser, and a thermocouple to monitor the reaction temperature. Teflon adapters were used in all of the flask joints to avoid silicone lubricant.
2. 2-(methylamino)ethanol (76 mL, 6 mol eq.) was added to the reaction vessel.
3. The reaction was placed under a nitrogen blanket.
4. The reaction was then heated for 8 hours at 100° C. and stirred sufficiently.
5. The contents of the flask were transferred to a 1-neck 2000 mL round bottom flask and dioxane was removed via a rotary evaporator.
6. Silicone product was re-dissolved in chloroform (500 mL) and transferred to 4000 mL separatory funnel (unreacted amine can be drained from separatory funnel before washing).
7. Product washed with 2000 mL 50/50 brine/10% sodium bicarbonate solution (2×), followed by a wash with 2000 mL 50/50 brine/water.
8. Silicone product collected from Step 2.7 and dried with sufficient amount of magnesium sulfate.
9. Product was vacuum filtered and solvent removed with a rotary evaporator/vacuum pump.
10. The concentrated product was then filtered with slight positive nitrogen pressure through a pressure filter system equipped with 5 μm PTFE filter into a 1000 mL round bottom flask to afford colorless intermediate product (477.6 g, 95% yield).
11. Product confirmed with NMR spectroscopy.

Step 3: Methacrylation with Methacrylic Anhydride.

1. Silicone product from Step 2.9 (450.8 g) was re-dissolved in anhydrous chloroform (450 mL, 1 mL/g silicone) and transferred to a minimum of a 2-neck 2000 mL round bottom flask (dried with heat gun) equipped with a overhead mechanical stirrer.
2. Triethylamine (58.9 g, 3 mol eq.) was added to the reaction, along with dimethylamino pyridine (0.017 g, 0.001 mol eq.) and 500 ppm BHT inhibitor relative to Step 2.9 product (112.7 mg).
3. An addition funnel (dried with heat gun) was added to the flask and methacrylic anhydride (67 mL, 3 mol eq.) was added to the funnel along with chloroform to dilute the anhydride (approx. 100 mL). The system was sealed and placed under a nitrogen blanket.

4. The reaction was stirred and the methacrylic anhydride was added drop-wise. After all the anhydride was added, the reaction was allowed to stir 15 hours at ambient temperature.
5. Water (approx. 700 mL) was added to the reaction and allowed to stir until all the anhydride had converted to methacrylic acid (approx. 15 hours).
6. Reaction transferred to 4000 mL separatory funnel, 700 mL brine added to help separation, and organic layer was isolated.
7. Isolated product layer was washed with 2000 mL 50/50 brine/10% NaHCO3 (×2), followed by 2000 mL 50/50 brine/water.
8. Product transferred to 1-neck 2000 mL RBF and stirred mechanically w/200 g Amberlyst A26 hydroxide resin (after resin was washed w/chloroform) for 48 hours until methacrylic salt absent from product (monitored by NMR). Note: Amberlite IRA-410 CL resin can be substituted for Amberlyst A26 hydroxide resin.
9. Resin separated from product by vacuum filtration.
10. Product dried w/sufficient amount of magnesium sulfate.
11. Product vacuum filtered and concentrated by rotary evaporator.
12. The concentrated product was then filtered with slight positive nitrogen pressure through a pressure filter system equipped with 5 μm PTFE filter into a 1000 mL round bottom flask to afford intermediate product with slight yellow tint (401 g, 89% yield).
13. Product confirmed via NMR spectroscopy and BHT concentration monitored by Gas Chromatography. The target level for BHT inhibitor is 500 ppm. Appropriate amount of BHT was back-added to methacrylated intermediate product to bring total BHT concentration to 500±100 ppm.

Step #4: Quaternization

1. Product from Step 3.10 (250.8 g) dissolved in THF (250 mL, 1.0 mL/g silicone) and transferred to 1-neck 1000 mL round bottom flask with magnetic stir bar.
2. Iodomethane (2.2 mol eq.) added to reaction.
3. Reaction vessel sealed with Teflon stopper and stirred in a 45° C. water bath for 7 hours.
4. System placed on a rotary evaporator to remove solvent and excess iodomethane to afford a yellow, waxy solid product.
5. Product was sealed and allowed to harden at approx. −20° C. for at least 2 hours.
6. Product moved to dry box with dry air environment (≦5% relative humidity) to be chopped/scraped with spatula until very fine in consistency.
7. Residual iodomethane/solvent removed with vacuum pump ($1.0 \times 10^{-2}$ mbar, product kept at ambient temperature).
8. Product moved back to dry box for transferring, sampling, etc. and stored at −20° C. with a drying agent to prevent moisture contamination (255.01 g yield).
9. Product confirmed by NMR spectroscopy, Mass Spectrometry and Gel Permeation Chromatography. BHT concentration monitored by Gas Chromatography and residual Iodomethane concentration monitored by Liquid Chromatography.

Example 4

Preparation of Film Using Monomer of Example 2

|  | Parts by weight |
| --- | --- |
| RD-1862 (Iodo salt form) | 9.30 |
| NVP | 41.85 |
| TRIS | 23.25 |
| HEMA | 18.6 |
| Propylene Glycol | 5.00 |
| SA | 1.50 |
| v-64 | 0.50 |
| IMVT | 95 ppm |

40 uL aliquots of a soluble, liquid monomer mix containing 9.3 parts by weight of the product from example 2, 23.3 parts TRIS, 41.9 parts NVP, 18.6 parts HEMA, 5 parts PG, 0.5 parts v-64, 1.5 parts SA, and 95 ppm IMVT were sealed between poly(propylene) anterior and posterior contact lens moulds under an inert nitrogen atmosphere, transferred to an oven and heated under an inert nitrogen atmosphere 2 h at 100° C. The cooled mold pairs were separated and the dry lens released from the mold, hydrated/extracted twice in deionized H2O for a minimum of 3 min, transferred to and sealed in an autoclave vial containing a buffered saline solution and autoclaved 30 min at 121° C. affording optically transparent, blue-tinted ophthalmic lenses.

Example 5

Preparation of Film Using Monomer of Example 3

|  | RD# | Parts |
| --- | --- | --- |
| $M_2D_{39}$plus | 1862 | 5.30 |
| M1-MCR-C12 | 1876 | 3.00 |
| NVP | 58 | 43.35 |
| TRIS | 142 | 20.25 |
| HEMA | 134 | 18.6 |
| UV blocker | 969 | 1.50 |
| vaso-64 | N/A | 0.50 |
| Reactive blue | 322 | 95 ppm |

Example 6

Preparation of Film Using Monomer of Formula (III)

|  | Parts |
| --- | --- |
| $M_2D_{39}$plus (Bromo salt form) | 9.30 |
| NVP | 41.85 |
| TRIS | 23.25 |
| HEMA | 18.6 |

-continued

|  | Parts |
| --- | --- |
| Propylene Glycol | 5.00 |
| SA | 1.50 |
| v-64 | 0.50 |
| IMVT | 95 ppm |

40 uL aliquots of a soluble, liquid monomer mix containing 9.3 parts by weight of monomer of formula III, 23.3 parts TRIS, 41.9 parts NVP, 18.6 parts HEMA, 5 parts PG, 0.5 parts v-64, 1.5 parts SA, and 95 ppm IMVT were sealed between poly(propylene) anterior and posterior contact lens moulds under an inert nitrogen atmosphere, transferred to an oven and heated under an inert nitrogen atmosphere 2 h at 100° C. The cooled mold pairs were separated and the dry lens released from the mold, hydrated/extracted twice in deionized H2O for a minimum of 3 min, transferred to and sealed in an autoclave vial containing a buffered saline solution and autoclaved 30 min at 121° C. affording optically transparent, blue-tinted ophthalmic.

Example 7

Properties of Films of Examples 4 and 6

| Sample | Modulus (GM/SQMM) | Tensile (GM/SQMM) | Elong (%) | Tear (GM/MM) |
| --- | --- | --- | --- | --- |
| Example 3 | 111 (4) | 35 (7) | 38 (9) | 3 (0) |
| Example 4 | 116 (8) | 62 (12) | 76 (15) | 4 (0) |

Standard deviation is given within the parenthesis.

Example 8

Preparation of Film Using Monomer of Example 2

|  | Parts |
| --- | --- |
| RD-1862 (Iodo salt form) | 6.30 |
| M1D11 | 3.00 |
| NVP | 41.85 |
| TRIS | 23.25 |
| HEMA | 18.6 |
| Propylene Glycol | 5.00 |
| SA | 1.50 |
| v-64 | 0.50 |
| IMVT | 95 ppm |

40 uL aliquots of a soluble, liquid monomer mix containing 6.3 parts by weight of the product from example 2, 3.00 parts of a monomethacrylated polydimethyl siloxane prepolymer, 23.3 parts TRIS, 41.9 parts NVP, 18.6 parts HEMA, 5 parts PG, 0.5 parts v-64, 1.5 parts SA, and 95 ppm IMVT were sealed between poly(propylene) anterior and posterior contact lens moulds under an inert nitrogen atmosphere, transferred to an oven and heated under an inert nitrogen atmosphere 2 h at 100° C. The cooled mold pairs were separated and the dry lens released from the mold, hydrated/extracted twice in deionized H2O for a minimum of 3 min, transferred to and sealed in an autoclave vial containing a buffered saline solution and autoclaved 30 min at 121° C. affording optically transparent, blue-tinted ophthalmic lenses.

Example 9

Properties of Films of Example 7

| Sample | Modulus (GM/SQMM) | Tear (GM/MM) |
| --- | --- | --- |
| Example 8 | 77 (6) | 3 (0) |

Standard deviation is given within the parenthesis.

What is claimed is:

1. A device comprising a polymerization product of a monomer mixture useful for making polymerized biomaterials comprising at least one monomer having the following formula:

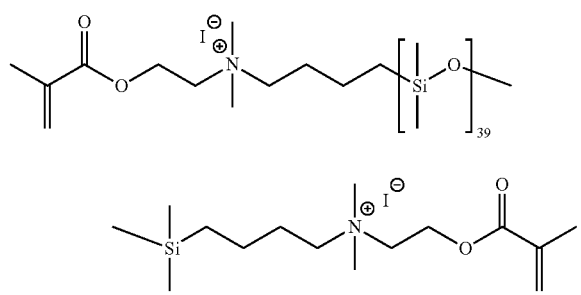

and at least one second monomer.

2. The device of claim 1 wherein the device is a contact lens.

3. The device of claim 2 wherein the contact lens is a rigid gas permeable contact lens.

4. The device of claim 2 wherein the contact lens is a soft contact lens.

5. The device of claim 2 wherein the contact lens is a hydrogel contact lens.

6. The device of claim 1 wherein the device is an intraocular lens.

7. The device of claim 6 wherein the intraocular lens is a phakic intraocular lens.

8. The device of claim 6 wherein the intraocular lens is an aphakic intraocular lens.

9. The device of claim 1 wherein the device is a corneal implant.

10. The device of claim 1 wherein the device is selected from the group consisting of heart valves, films, surgical devices, vessel substitutes, intrauterine devices, membranes, diaphragms, surgical implants, blood vessels, artificial ureters, artificial breast tissue, membranes for kidney dialysis machines, membranes for heart/lung machines, catheters, mouth guards, denture liners and ophthalmic devices.

11. A method of making a device comprising:
providing a monomer mixture comprising a monomer having the following formula:

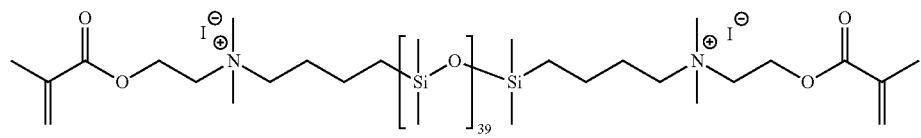

and at least a second monomer;
subjecting the monomer mixture to polymerizing conditions to provide a polymerized device; and
extracting the polymerized device.

12. The method of claim 11 wherein the step of extracting is performed with non-flammable solvents.

13. The method of claim 11 wherein the step of extracting is performed with water.

14. The method of claim 11 further comprising the step of packaging and sterilizing the polymerized device.

* * * * *